United States Patent
Jennen et al.

(10) Patent No.: US 12,310,326 B2
(45) Date of Patent: May 27, 2025

(54) METHOD AND MILKING DEVICE FOR MILKING A DAIRY ANIMAL

(71) Applicant: LELY PATENT N.V., Maassluis (NL)

(72) Inventors: Peter Leonardus Hendricus Jennen, Waddinxveen (NL); Pieter Gerlof De Groot, Giessenburg (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 17/784,043

(22) PCT Filed: Nov. 25, 2020

(86) PCT No.: PCT/NL2020/050740
§ 371 (c)(1),
(2) Date: Jun. 9, 2022

(87) PCT Pub. No.: WO2021/118342
PCT Pub. Date: Jun. 17, 2021

(65) Prior Publication Data
US 2023/0017182 A1 Jan. 19, 2023

(30) Foreign Application Priority Data
Dec. 10, 2019 (NL) .................................... 2024417

(51) Int. Cl.
*A01J 5/017* (2006.01)
*A01J 5/01* (2006.01)
*G05B 13/02* (2006.01)

(52) U.S. Cl.
CPC ............... *A01J 5/017* (2013.01); *A01J 5/01* (2013.01); *G05B 13/024* (2013.01)

(58) Field of Classification Search
CPC .................................... A01J 5/01; A01J 5/017
See application file for complete search history.

(56) References Cited

U.S. PATENT DOCUMENTS 5,704,311 A * 1/1998 van den Berg ....... A01J 5/0175
119/14.08
6,651,583 B1 * 11/2003 Lind ....................... A01J 5/007
119/14.02
(Continued)

FOREIGN PATENT DOCUMENTS

CN    101677521 A    3/2010
CN    102958351 A    3/2013
(Continued)

OTHER PUBLICATIONS

International Search Report issued Mar. 12, 2021 in PCT/NL2020/050740 filed on Nov. 25, 2020, 4 pages.

Primary Examiner — Magdalena Topolski
Assistant Examiner — Edgar Reyes
(74) Attorney, Agent, or Firm — Oblon, McClelland, Maier & Neustadt, L.L.P.

(57) ABSTRACT

A method for milking a dairy animal using a milking device with a measuring device for a milk parameter, the method including identifying the dairy animal, determining a milking interval, attaching milking cups to the dairy animal, calculating, according to a first formula, an expected value for the milk parameter, milking the dairy animal, and detaching the milking cup when a first detachment criterion has been met. During the milking step and/or during the detaching step, use is made of the expected value of the milk parameter without determining the actual value of the milk parameter. The actual value is the value of the milk parameter if the milking takes place using a second detachment criterion which is stricter than the first detachment criterion. The method further includes measuring the actual value of the milk parameter for the present milking and updating the first formula.

23 Claims, 2 Drawing Sheets

(56) References Cited

U.S. PATENT DOCUMENTS

Figure 1:
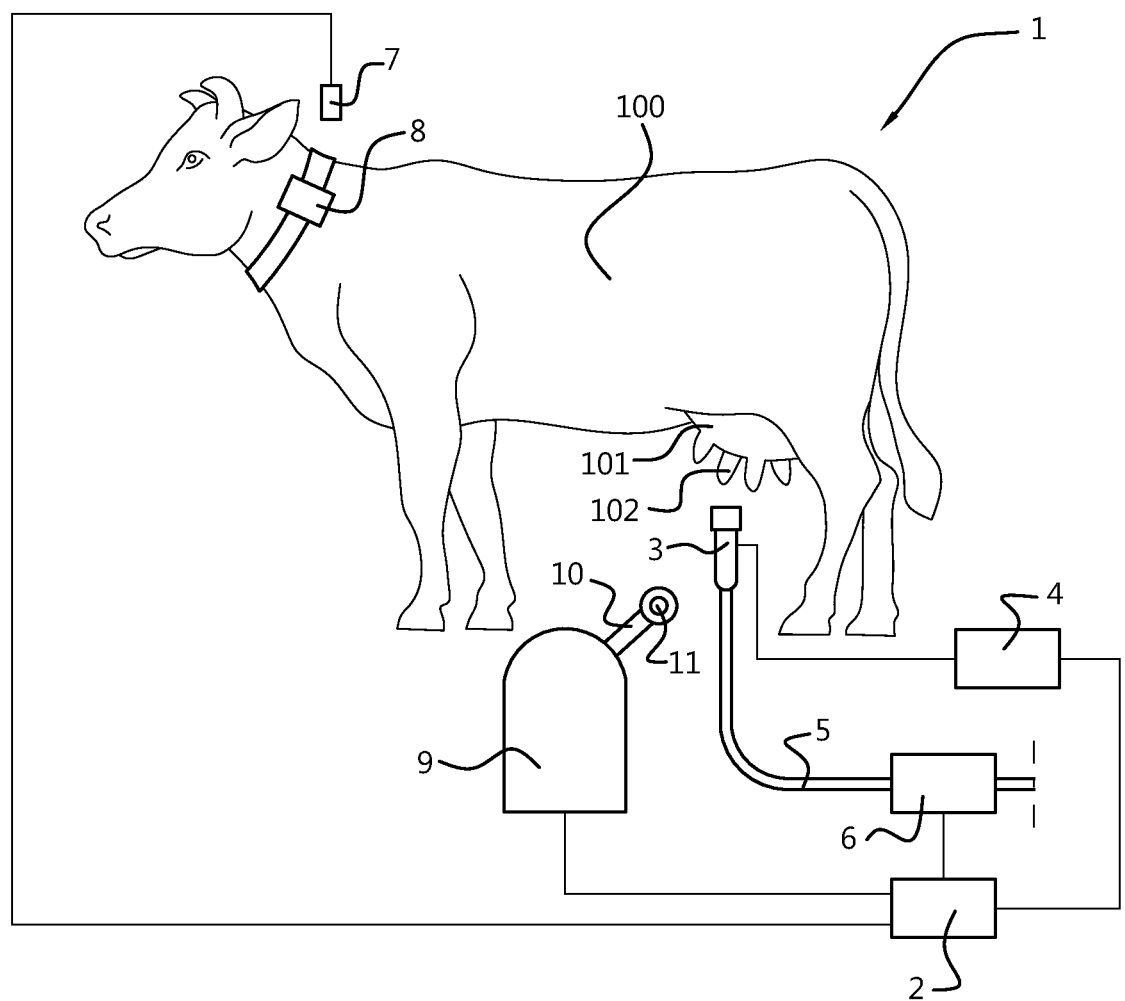

| | | | |
|---|---|---|---|
| 8,505,482 B2* | 8/2013 | Sandberg | A01J 5/007 |
| | | | 119/14.08 |
| 8,646,411 B2* | 2/2014 | Wartenhorst | A01J 5/007 |
| | | | 119/14.17 |
| 2002/0148408 A1* | 10/2002 | Gompper | A01J 5/01 |
| | | | 119/14.14 |
| 2003/0019431 A1 | 1/2003 | Van Den Berg et al. | |
| 2003/0226507 A1 | 12/2003 | Theelen | |
| 2004/0244699 A1 | 12/2004 | Schwering et al. | |
| 2008/0314322 A1* | 12/2008 | Stellnert | A01J 7/04 |
| | | | 119/14.08 |
| 2011/0247564 A1 | 10/2011 | Schrader et al. | |
| 2011/0303155 A1* | 12/2011 | Tucker, Jr. | A01J 5/017 |
| | | | 119/14.08 |
| 2012/0118236 A1 | 5/2012 | Van Der Tol | |
| 2012/0204798 A1 | 8/2012 | Kortekaas et al. | |
| 2012/0325153 A1* | 12/2012 | Mostert | A01J 5/007 |
| | | | 119/14.08 |
| 2020/0396953 A1 | 12/2020 | Paulrud | |

FOREIGN PATENT DOCUMENTS

| | | |
|---|---|---|
| CN | 104869810 A | 8/2015 |
| EP | 1 279 326 A1 | 1/2003 |
| WO | WO 03/000042 A1 | 1/2003 |
| WO | WO 2010/074556 A1 | 7/2010 |
| WO | WO 2019/156619 A1 | 8/2019 |

* cited by examiner

METHOD AND MILKING DEVICE FOR MILKING A DAIRY ANIMAL

In a first aspect, the present invention relates to a method for, in a milking, milking a dairy animal by means of a milking device comprising milking cups and a measuring device for measuring a milk parameter, the method comprising an identification step, comprising identifying the dairy animal, an interval-determining step, comprising determining a milking interval as the time since the previous milking of said dairy animal, an attachment step, comprising attaching one of the milking cups to a teat of the dairy animal, a calculation step, comprising the milking device calculating at least one expected value of said milk parameter of the dairy animal according to a first formula, wherein the first formula depends on said milking interval and on historical values of said milk parameter of the identified dairy animal measured during one or more previous milkings by the measuring device, a milking step, comprising milking a teat of the dairy animal in a present milking, and a detaching step, comprising detaching the milking cup when a first detachment criterion has been met, wherein use is made of the at least one expected value of the milk parameter in the milking step and/or in the detaching step.

Such methods are as such being used already in dairy farming. For example, for the milking, at least for the decision whether or not to milk a dairy animal, an expected value for the milk yield is used. This is usually calculated from an optionally historic milk production speed which is multiplied by the milking interval, the time between the point in time of the previous milking and the present point in time. Other milk-related decisions and actions may similarly also depend on, inter alia, the milking interval.

However, in practice, it has been found that decisions taken on said basis do not always lead to entirely correct or desirable results.

It is therefore an object of the present invention to improve said method in such a way that it will, in practice, lead to more correct decisions and decisions which are correct for longer.

The invention achieves this object at least partly by means of a method as claimed in claim 1, in particular by means of a method for milking, in a milking, a dairy animal by means of a milking device with milking cups and a measuring device for measuring a milk parameter, the method comprising an identification step, comprising identifying the dairy animal, an interval-determining step, comprising determining a milking interval being the time since the previous milking of said dairy animal, an attachment step, comprising attaching one of the milking cups to a teat of the dairy animal, a calculation step, comprising the milking device calculating at least one expected value of said milk parameter of the dairy animal according to a first formula, wherein the first formula depends on said milking interval and on historical values of said milk parameter of the identified dairy animal measured during one or more previous milkings by the measuring device, a milking step, comprising milking a teat of the dairy animal in a present milking, and a detaching step, comprising detaching the milking cup when a first detachment criterion has been met, wherein use is made of the at least one expected value of the milk parameter in the milking step and/or in the detaching step, without in this case determining the actual value of said milk parameter for the milking, wherein an actual value is the value of said milk parameter if the milking of the teat takes place using a second detachment criterion which is stricter than the first detachment criterion, wherein the method furthermore comprises a measuring step, comprising, if the actual value of said milk parameter has not been determined for at least a predetermined number of milkings preceding the present milking and/or for all milkings for at least a predetermined time period preceding the present milking, measuring the actual value of said milk parameter for the present milking, and an updating step, comprising, if said measured actual value differs from said expected value, automatically updating, with and in the milking device, the first formula by means of the determined milking interval for the present milking and said measured actual value of the milk parameter of the present milking, in particular that a difference between said measured actual value and an expected value for the present milking which has been recalculated using the updated first formula becomes smaller, in particular becomes substantially zero.

In this case, the invention makes use of the following understanding. Many known milking methods use an expected value for one or more milk parameters. For example, the readiness of an animal for milking is a known criterion, wherein an expected value for the milk yield determines if a dairy animal will be milked or not. If the method from the prior art uses an expected value instead of an actually measured value, then this actual value will in many cases not be measured (again) during the practice of milking either. For example, if a detachment criterion indicates that the milking cups have to be detached after a specific portion of the expected milking time has lapsed, for example because it is no longer efficient after this time to continue milking, then the actual milking time which is associated with that dairy animal and that milking interval will not be determined again either. Furthermore, in a certain sense, the abovementioned milk yield is not a "real" value either, because although the milk yield achieved during the milking may be equal to the expected value, it does not have to be a reflection of the "real" milk yield, that is to say the amount of milk produced by the dairy animal and obtainable by the milking device.

A dairy animal is not a machine with constant properties. Not only can properties such as milk production, milking time and milk yield vary in the course of a lactation, but also as a result of a cow growing up, possible illnesses, etc. However, in many cases, milkings are unable to determine the "real" values, because they are discontinued before these values are even reached. As a result thereof, the "real" milk production etc. cannot be determined. Although this may have an economic advantage since the capacity of the robot or other milking device is thus larger, this also means that the data which have been used precisely for this milking may start to deviate ever further from the "real" values. The inventors have realised that it may be advantageous to occasionally allow a milking to continue, beyond the economically advantageous, but actually premature termination of milkings, to continue to the point that the "real" values can be determined. In other words, occasionally a milking is continued beyond the criteria which are commonly applied to that dairy animal.

The expression "a stricter second detachment criterion" is understood to mean that the detachment criterion is different in such a way that detaching occurs at a point in time where less milk has remained behind in the teat or the udder quarter, respectively, than was the case when detaching according to the first, less strict detachment criterion. During a normal milking, for example, the milk flow will drop after some time. Usually, a milking is then terminated at a point in time where a compromise is reached between optimising the milking device capacity, animal health through milking the teats to a sufficient degree, etc. This compromise is reached, for example, at a certain milk speed, in an absolute sense, e.g. 200 ml/minute, or in a relative sense, e.g. 10% of the maximum milking rate. However, the udder then usually still contains milk to be milked. For a good udder health, it is even more important that not too much residual milk remains behind in the udder. And it is exactly this which cannot be assessed properly if the detachment criterion is only based on milk flow and does not change. For example, use of the invention might result in the detachment criterion for a dairy animal changing, because otherwise too much residual milk would remain behind, or less residual milk would remain behind, so that adjusting the detachment criterion may lead to earlier removal without resulting in drawbacks for the dairy animal.

It will be clear that a milking which would usually be terminated according to the first detachment criterion well before the machine can no longer milk any milk can be continued well beyond that point, that is to say using the stricter second detachment criterion, so that a better, more correct indication can be obtained of the actual milk parameters (milk production, etc.). The "real", "actual" value of the milk parameter(s) which is determined then may prevent a change in the animal leading to unwanted, undesirable effects, such as more or even too much residual milk in the udder, which could result in detrimental effects to health.

In summary, it is thus an object of the invention to determine more correct values for the underlying milk properties of a dairy animal by occasionally extending a milking for longer than is usual for that dairy animal. The value(s) which are determined during this milking can then be processed in the formula(e) which is/are used in decisions and settings for subsequent milkings.

For the invention, it is in principle the milk parameter(s) per teat which is (are) being looked at. Obviously, it is also possible to define a milk parameter for several teats of the udder, that is to say for the dairy animal, as a whole. For example, the parameter values for all teats (four for a cow or a different number, such as two, for a dairy goat) are added up or averaged or the like. For the sake of convenience, an individual teat will be used below, with the corresponding embodiment for several or all teats deemed to be included.

In the context of the present invention, the expression "if said measured actual value differs from said expected value" is understood to mean that said values differ, for example, by at least one predetermined degree of percentage, such as 1%, 2% or 5%. The difference threshold value used or the percentage used may in this case be chosen to depend on all kinds of factors. For example, a low percentage may be chosen if an updating step is often used, that is to say with a small number of previous milkings without determining the actual value. Conversely, a high percentage may be chosen if an updating step takes place only rarely.

The first formula may directly or indirectly depend on the milking interval and/or on historic values of the milk parameter. All this depends on which milk parameter is intended. Thus, certain parameters or settings for milking may depend on the amount of milk produced by the dairy animal which in turn depends on the time or the present milking interval. Specific cases will be explained in more detail below.

The second detachment criterion is stricter if it leads to more milking of the teat than the first, less strict detachment criterion. Thus, the measured value comes closer to the "real" value of the milk parameter. In particular, the second detachment criterion results in substantially complete milking of the teat.

In this case, it is expressly pointed out that it is difficult to provide an absolute criterion for a "real" milking or "real" value. To a certain degree, it is possible to continue milking by machine until the machine is unable to extract any more milk, i.e. in particular the second detachment criterion is so strict that it would lead to the substantially complete emptying of the teat, but this is usually too unhealthy for, in particular, the teats. But as long as milking is continued, more information is obtained about the part of the milking which normally, that is to say when using the first detachment criterion, remains hidden. Changes which occur in this hidden part and which may affect the first part of the milking are thus nevertheless brought to light.

It should be noted that it is possible that the milking of a teat ends before the, first or second, detachment criterion is met. This is the case, for example, if a milking cup is kicked off or when there is a malfunction in the milking device. In such a case, it will be clear that the value which has been measured is not suitable for use in updating the first formula. In such a case, the value measured when detaching according to the second detachment criterion or the "real" value should be determined in a subsequent milking. In particular, it is not the next milking which is used for this purpose, but a subsequent regular milking, because, in particular, the amount of residual milk may be totally different then than it would be after a regular milking, i.e. a milking in which detachment takes place according to the first detachment criterion.

Specific embodiments of the invention are described in the dependent claims and in the following part of the description.

In embodiments, the milking device comprises a robotic milking device which is freely accessible to the dairy animal. With such milking robots, in which dairy animals can be milked without any human supervision at all at, in principle, any desired point in time, it is important to have a good indication of the real parameter values. After all, the milking interval and the parameter values associated therewith will vary to a much greater degree than is the case with conventional milking devices, in which a dairy animal is guided to a milking station at fixed points in time. Nevertheless, even with the latter milking devices, a better indication of the parameter values is useful, for example also with regard to the settings of the milking device.

It has already been indicated above that the second detachment criterion is stricter than the first detachment criterion. In particular, the first detachment criterion comprises that the milk flow from said teat reaches a lowest permitted, in particular animal-dependent, first detachment threshold value, wherein the second detachment criterion comprises that the milk flow from said teat drops below a second detachment threshold value which is higher than the first detachment threshold value. This embodiment takes the profile of the milk flow during the milking into account, which decreases towards the end. Continuing to milk therefore means continuing to milk up to a lower threshold.

In the prior art, there are many known ways in which the first detachment threshold may be calculated or determined. For example, there is a fixed threshold, such as 200 ml/minute. It is also possible to take a percentage of a maximum milk flow or of a running average of the milk flow during the milking, such as 10% or 20% thereof, etc.

In these embodiments, the invention aims to determine the actual value of the milk yield and/or milk production or the like more accurately by occasionally continuing to milk until a lower milk flow is reached. In case the last part of the milk flow profile in particular is (substantially) changed with the dairy animal, it may be advantageous to adjust formulae for the expected value(s). For example, the milk flow profile of the animal by now drops more quickly or, on the contrary, less quickly after the usual detachment threshold. The actual milk production then differs from what it was in the past and it is better to also adjust the formula for the expected value of the milk yield or milk production, and advantageously to also adjust the detachment criterion to this changed expected value (in fact to the changed milk flow profile).

It should be noted here that with some methods for milking, the detachment threshold for teat/teats which are milked last is sometimes increased, that is to say, is made less strict. The aim of this is to free up milking machine capacity sooner. However, a drawback thereof is that an even larger part of the milking remains unknown for the respective teat/teats, so that the real milk production is known to an even lesser degree. In particular if the attachment order is fixed, the last attached teat will relatively often also be the teat which is milked last. And it is in particular with robotic milking devices that the attachment order is often constant, not only because dairy animals are often creatures of habit and thus changing attachment orders could cause some undesired stress, but in particular because already attached milking cups may be in the way of the attaching robot arm which often attaches a milking cup on the same side.

Therefore, with some embodiments of the method according to the invention, said teat is the last-milked teat during the milking and the first detachment criterion is a detachment criterion for the last teat for detaching said last-milked teat, wherein the detachment criterion for the last teat is less strict than the detachment criterion for one or more of the other teats which stopped being milked earlier during the milking. For the sake of clarity, during a normal milking, the last-milked teat is thus detached according to the detachment criterion for the last teat, and the other teats are detached according to another detachment criterion which is stricter than the detachment criterion for the last teat. According to the invention, said last-milked teat is milked during the measuring step in a milking to determine the real value and detached according to a second detachment criterion which is stricter than the detachment criterion for the last teat. In principle, this second detachment criterion for the last-milked teat may be identical to the "other detachment criterion", thus in fact the first detachment criterion for the other teats which stopped being milked earlier. After all, the first detachment criterion is stricter and may therefore serve as the second detachment criterion according to the invention for the other teats. However, if the "other detachment criterion" for the other teats is regarded as the first detachment criterion according to the invention for those teats, it is also possible to use, both for the last-milked teat and for the other teats, a second, even stricter detachment criterion. This last variant will be used in particular if a measuring step is also performed for the other teats, in which the second detachment criterion will after all also be applied to these teats.

During a normal milking, it is also possible to milk more than one teat using the second detachment criterion, such as two or even three teats. In this way, it can be ensured that the milking overall lasts for as short a time as possible, without leaving an irresponsible amount of milk behind in said teats. During the measuring step, it is then possible, in particular for all teats which are usually milked using the second detachment criterion, to now apply the stricter "other" detachment criterion, thus in particular the first detachment criterion which is used for the first teat (or teats) or a completely different detachment criterion which can then be used for all teats.

As mentioned above, the invention aims to determine the actual value of the milk parameter(s) by measuring this value under stricter circumstances during a new milking, in particular a stricter detachment criterion. It is even more accurate to perform a milking using the second detachment criterion twice in succession, wherein the "real" value of the milk yield measured during the second milking is taken as the value to update the first formula, in particular the milk production speed. In this way it is possible to measure the real milk yield accurately with the same initial state and final state of the udder/dairy animal. Incidentally, this improved accuracy during two successive milkings using the stricter detachment criterion not only applies to the milk yield or milk production speed, but in principle to all milk parameters. Therefore, specific embodiments comprise that the milking step and the measuring step comprise two successive milkings using the second detachment criterion.

Alternatively, it is also possible to milk the teat further, or as far as is possible, in order then to determine the relevant production during the next milking as the milk yield at the normal, first detachment criterion. After all, there is then in principle no obtainable milk present after the previous, (more) complete milking, so that all milk which is then obtained in a milking session using the normal first detachment criterion is also the entire amount of obtainable milk for this teat/that quarter produced during a milking according to the first detachment criterion. But it should be noted that, in this way, it is not yet determined if, due to changes in the dairy animal, it might be possible to obtain more milk using a detachment criterion which is adjusted on the basis of the measured actual value of, for example, the milk yield/milk production or other milk parameter. It is precisely here that the present invention is advantageous, because the actual value is also determined and monitored, with it being possible to update formulae which are used for milking, detaching, etc.

The number of milkings in which the actual value was not determined which precede the present is not limited per se in any particular way. Nevertheless, in embodiments, said predetermined number of milkings is at least 10, in particular at least 20. Using such numbers achieves a good balance between increased knowledge of the milk properties of the dairy animal, on the one hand, and capacity loss of the milking device and/or possible greater strain on the teats of the dairy animal, on the other hand. However, any other number of milkings is possible, with a higher number offering the advantage of a smaller loss in capacity and strain on the teats, and a lower number offering more and more immediate knowledge about milk properties.

Alternatively or additionally, said predetermined time period is at least one week, in particular at least two weeks. Such periods of time again make it possible to achieve a good balance between updating the knowledge about milk properties and production capacity/strain on teats. Other periods of time are possible.

In particular, said predetermined number of milkings and/or said predetermined time period depends on the lactation stage of the dairy animal, in particular on the number of days in lactation. In this case, the insight is applied that in particular at the start of lactation, when the dairy animal "comes into lactation", the properties of the dairy animal can change quite considerably, so that updates of the knowledge concerning that can take place at a higher frequency than later during the lactation. For example, in the first two months of lactation, a predetermined number of 10 milkings or a period of 1 week, respectively, is maintained for the regular milkings, i.e. between the successive measuring steps, whereas thereafter a lower frequency may be chosen, such as once every 20 milkings or every two weeks. Obviously, other frequencies and frequency steps are also possible. In addition, it is possible to allow the measurement regime for applying the measuring step to depend on other properties, such as the age of the dairy animal. Thus, a heifer will still undergo a quite considerable change with regard to properties during milking, not only depending on the number of days in lactation, but also depending on its age. This change will be less significant as its age increases.

The milk parameter may be one of a variety, as has already been indicated above. In embodiments the milk parameter is or comprises an amount of residual milk in the teat. Here, the amount of residual milk is in fact the amount which is obtainable by milking, but which has not in actual fact been obtained by milking. Exactly because this milk is obtainable, but has not been obtained, this is, without additional measures such as according to the invention, almost by definition an unknown variable. However, knowledge about this may contribute, on the one hand, to optimising the milking process and, on the other hand, to preventing udder problems if too much residual milk remains behind. Here it should again be noted that it is not impossible for the milk properties of a dairy animal to change to such an extent that it is not impossible, if the detachment criterion and milking settings remain unchanged, that the amount of residual milk increases or, on the contrary, decreases to an amount which is so low as to be considered a danger to health. Furthermore, it should be noted that some milk remains behind in the udder even after all possible milking techniques have been used. This milk is sometimes also referred to as 'residual milk', but because it is not obtainable, it will not be taken into account here.

In embodiments, the first detachment criterion for said teat is updated so that when the teat is detached, the expected amount of residual milk satisfies a predetermined residual milk criterion, in particular is smaller than a residual milk threshold value. With these exemplary embodiments, the knowledge obtained regarding residual milk is thus used to prevent an excessive amount of residual milk from remaining behind in the udder. It is at least possible to choose a value for a residual milk threshold value which counteracts or prevents udder problems. Such values may also be dependent on the animal and lactation stage and may, for example, be chosen on the basis of literature or historic values. The detachment criterion may for example be adjusted by choosing a different detachment threshold for the milk flow which ensures, or ensures more reliably, that the amount of residual milk remains or drops under said residual milk threshold value. It is also possible to detach on the basis of the amount of milk obtained, as measured by means of a milk meter, or on the basis of a milking time, associated with the intended amount of milk. With this and other embodiments, it is advantageous, according to the invention, if the knowledge regarding milk production can be updated on the basis of the measured actual value(s).

In embodiments, the milk parameter comprises the milk yield, wherein the first formula comprises a term "milking interval*milk production speed", and wherein the milk production speed is updated on the basis of the milking interval of the present milking and the measured real value of the milk yield, more particularly according to "milk production speed=measured milk yield/present milking interval". Obviously, this is a very important milk parameter which has a direct or indirect effect on many matters surrounding the milking. Even if knowledge of the milk yield such as can be achieved using the first detachment criterion, i.e. with regular milkings, seems sufficient to cover many aspects, accurate knowledge of the real milk yield is very important for many other settings and the like during milking. As has already been described above, there remains an amount of residual milk behind after milking which is unknown, precisely because it is not being milked. But this residual milk may in actual fact have an effect on the health of an udder, as is known per se in the literature. The detachment criterion may have to be modified for this or other reasons, such as for the pretreatment, which will be discussed further below.

In embodiments, a first detachment criterion comprises, for at least one teat, in particular the last-milked teat, that detachment takes place when a predetermined percentage of the expected milk yield, in particular 90% or 80% of the expected milk yield, has been reached. As has already been indicated, this detachment criterion may be used to release the milking device earlier than is the case with standard milking of the last-milked teat, making it possible to increase the total production capacity. It is also possible to apply the detachment criterion to, for example, the last two teats. If, according to the usual criterion, milking of these two teats would terminate approximately simultaneously, then applying the criterion to both teats will ensure in a more reliable way that milking is not continued for an unnecessarily long period of time, so that the capacity improvement then also remains ensured. Furthermore, it is possible to apply the detachment criterion to all teats, for example for highly productive dairy animals or for dairy animals which often visit the (robotic) milking device. With such animals, a certain, slightly larger amount of residual milk is less problematic, but at the same time, the milking capacity is still being increased. Incidentally, in such cases, it is also possible to apply this other detachment criterion only during certain periods, for example if the milking device sees a peak in the number of visits, as occurs on dairy farms with automatic milking systems. For example, it is possible to consider a possible queue of dairy animals.

In attractive embodiments, the attachment step and/or the milking step comprises pretreating the teat, wherein a time period and/or an intensity of the pretreatment depends on the expected milk yield. In this case, the milk parameter is in particular the milk yield again. Pretreatment comprises cleaning and stimulating the teat/teats to prevent lumps from ending up in the milk and in order to generate the milk let-down reflex which serves to push alveolar milk from the milk secretory cells and thus make it obtainable.

It has been found that the milk yield, at least the amount of milk present in the udder or the quarter, may be important in the pretreatment of a teat or udder. If a lot of milk is present, i.e. for example in case of a high production or a long milking interval, the amount of so-called cistern milk will be greater. Cistern milk is milk which is obtainable without a separate stimulating pretreatment of the dairy animal. This milk forms a kind of 'excess' when a certain amount of alveolar milk has already been produced which can only be obtained after the milk let-down reflex has been generated. In order to milk a dairy animal with a large amount of cistern milk, the duration and/or intensity of the pretreatment may be reduced. Where a dairy animal with little cistern milk may require, for example, a pretreatment duration of 60 seconds, this may be reduced in case of a large amount of cistern milk to, for example, 50 of 40 seconds, because the subsequent milking of cistern milk without straining the teat is in fact a continuation of the pretreatment. In this way, it is thus possible to also increase the capacity of the milking system. Alternatively or additionally, it is possible to render the pretreatment less intense. As a result thereof, the udder, or at least the teat, is subjected to less strain.

With such embodiments, it is of great importance to have a correct indication of the real, actual amount of milk in the udder. After all, if gradually more residual milk were to remain behind in the udder and consequently the calculated figure for the real milk yield or production is too small, the possibility of making the pretreatment shorter or less intense is missed. The invention reduces this risk by occasionally measuring the actual milk production or milk yield more accurately.

In embodiments, the milk parameter comprises the milking time of the milking. In particular, in this case, the detaching step depends on the expected milking time. For example, the expected value of the milking time may serve to maximise the milking time. At times, a milking may proceed too slowly, so that only little of the available milk is obtained, but the detachment criterion is not met for a(n excessively) long time. In order to prevent excessive strain on the teat, it is therefore possible to set a maximum milking time as a detachment criterion. In this case, the maximum milking time may be based on the milk yield or the historic milking time. Both may become more accurate if the actual value is determined occasionally according to the invention. Thus, this detachment criterion and the milking time on which it is based may also be updated by occasionally measuring the respective actual value.

Alternatively or additionally, another milk parameter is determined by means of the milking time. Thus, it is possible to measure the milk flow as a function of time, but only to take the milk flow values into account from a certain point of the expected milking time onwards when determining a milk flow value, or as a mathematical function thereof, for the purpose of for example a detachment criterion. For example, as has been described above, an arithmetic or running average of the milk flow is calculated and, for example, 10% or 15% thereof is used as a threshold value for the purpose of the detachment criterion. It will be clear that the expected value of the milking time then also has to be determined correctly. The present invention helps to improve this calculation.

Furthermore, it is conceivable that milking may be difficult due to the fact that an air supply to the milk discharge line is blocked. In such a case, the discharged milk would leave a vacuum behind in the line which would prevent further discharge. This is a case in which milking takes much longer and which may thus result in excessive strain on the teats and a capacity loss of the milking device. In embodiments, the detachment criterion then comprises, for example, that removal takes place after a time period equal to the expected milking time multiplied by a factor >1, such as 1.5. In this case as well, knowing the real milking time more accurately may contribute to a more animal-friendly milking and to not unnecessarily limiting the capacity of the milking device.

In embodiments, the milk parameter comprises at least one of the milk yield, the residual milk yield, the milking time and the residual milking time, and the milking step comprises a reattachment action in case the milking cup inadvertently becomes detached, with the reattachment action depending on the expected value of said at least one of the milk yield, the residual milk yield, the milking time and the residual milking time calculated according to the first formula. In particular, the is With some milkings, a milking cup may unexpectedly and prematurely become detached from the teat, for example by a conscious or unconscious action of the dairy animal, due to water entering the milking cup, due to the milking cup having been attached incorrectly and this not having been noticed, etc. The milker or the robotic milking device may then decide to re-attach or the milking cup. If, as is the case, for example, in the latter situation, little or no milk was obtained from the teat until the moment the milking cup became detached, the teat may become strained and, in addition, the capacity of the milking device will certainly decrease as well, but reattachment can still result in a large amount of milk being obtained and even preventing that too much residual milk remains behind. Alternatively, for example, the amount of milk which can still be obtained is relatively small or the remaining milking time is relatively short, and a reattachment action may be omitted.

It is therefore advantageous to have an accurate indication of the amount of residual milk in the teat, the quarter, or of the remaining milking time. Although the amount of milk which has been obtained from each teat and the duration of the milking so far is known, these values have to be compared to the associated expected value. It will be clear that if the last-mentioned value is not correct, the expected amount of residual milk or the remaining milking time will also be incorrect. Therefore, the present invention also offers the advantage of a correct calculation of the expected value here, and thus a better basis for the reattachment action.

In a second aspect, the invention also relates to a milking device for milking a dairy animal with teats, which milking device comprises milking means with milking cups for milking a dairy animal, a measuring device for measuring a milk parameter, an identification device for identifying the dairy animal, and a control unit, configured to carry out a method according to the first aspect of the invention. Such a milking device is suitable for using the advantage of the invention as described for the method in milkings. In this case, the milking device regularly determines a more accurate value for one or more milk parameters, so that for example thereby one or more milking settings, such as a detachment criterion, can be adjusted if necessary. For more details about these advantages and possible particular forms which will also apply to the correspondingly equipped milking devices, reference is made to the description of the method given above.

In this case, the control unit does not have to form a part of the milking device physically, but may also be a (network) connection with an external device. For example, it is sufficient if there is a network connection to an external server which is configured to carry out the method, if desired in cooperation with the rest of the milking device for performing the required measurement(s). In this way, the method may be carried out, for example, via the "cloud". This makes it easier to make modifications to a criterion or the like efficiently and centrally.

In particular, the milking device is a robotic milking device. Since such milking devices in principle function without human supervision, it is very important that the data on the basis of which they will perform a milking are accurate. In addition, dairy animals may often visit such robotic milking devices completely voluntarily, so that the milking intervals may vary greatly. Therefore, (more) accurate knowledge of milk production and other milk parameters is important in order to be able milk more efficiently, on the one hand, and more animal-friendly, on the other hand. In principle, it is also possible for the milking device to be a so-called conventional milking device, wherein the milking cups are attached by a milker. In this case, detaching the milking cups may also take place automatically individually or as an entire teat cup cluster. In the latter case, in principle all four (with dairy cows) milking cups are removed simultaneously, with, for example, the entire milk flow of the animal being used in the detachment criterion. Nevertheless, it is then also possible occasionally to milk according to a stricter criterion and thus to detach the milking cups later so as to be able to update the criterion if necessary.

The milking device, or its control unit, comprises a clock for determining a milking interval and/or a milking time for a milking. Furthermore, in embodiments, the milking device comprises a milk meter and/or a milk flow meter, for measuring a milk yield or a milking rate of a milking, respectively. In this case, the milking rate can in principle be the time derivative of the milk yield and vice versa, so that the milking rate can also be measured using a continuously measuring milk meter and a clock, and the milk yield can also be determined using a continuously measuring milk flow meter and a clock. By means of said meters, many of the relevant variables can be determined more accurately using the methods according to the invention, thus making it possible to improve milking.

In exemplary embodiments, the milking device furthermore comprises pretreatment means for the pretreatment of the teats of the dairy animal using an intensity and/or pretreatment duration which is adjustable by the control unit. Such pretreatment means may be all kinds of known pretreatment means, such as a set of rotating brushes or a separate cup which clean(s) and stimulate(s) the teats and udder. Also, cleaning and stimulating means may be incorporated in a milking cup, so that the cleaning, stimulating and milking functions are applied in one and the same means. In this case, the cleaning and stimulating means may comprise, for example, water and air nozzles.

Figure 2A:
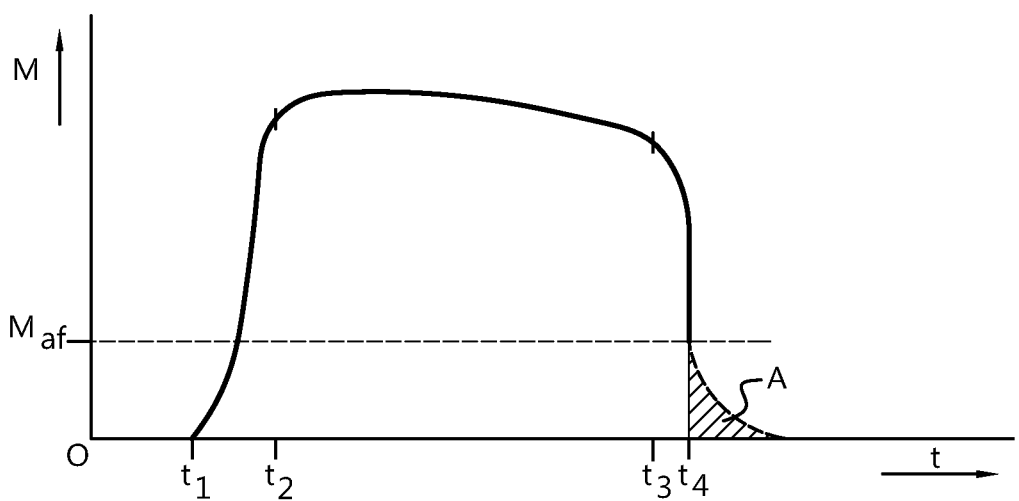
Figure 2B:
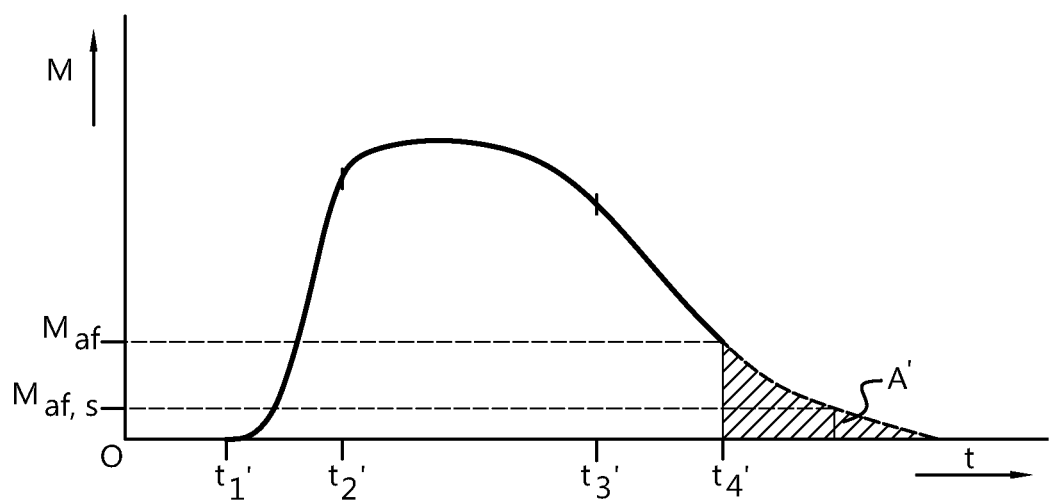

The invention will be explained in more detail below by means of the drawing, in which:

FIG. 1 shows, highly diagrammatically, a milking device according to the invention, and FIGS. 2a, 2b diagrammatically show a diagram of a milk flow profile.

FIG. 1 shows, highly diagrammatically, a milking device 1 according to the invention. The milking device 1 comprises a control unit 2 and milking cups 3 and other milking means 4, a milking hose 5 with a milk meter 6, an identification device 7 for ID tags 8 and, optionally, a robot 9 with a robot arm 10, here provided with a teat brush 11.

Reference numeral 100 denotes a dairy animal, with an udder 101 and teats 102.

The milking device 1 is shown only highly diagrammatically and, in practice, obviously comprises a number of milking cups 3, other milking means 4, milking hoses 5 and milk meters 6 corresponding to the number of teats 102 of the dairy animals which are normally to be milked. In this case, these are cows 100 having four teats 102. The other milking means 4 comprise, for example, a pulsator and a vacuum pump, as is generally known.

Upon entering a milking stall (not shown here), the identity of the dairy animal 100 will be recognised by means of an animal identification device 7, such as a tag reader. To this end, the dairy animal 100 is provided with a collar comprising an ID tag 8, such as an RFID chip. On the basis of the established animal identity and the previously stored data associated with that animal, the control unit 2 may choose, for example, settings for the milking. All this is generally known in the prior art.

In a robotic milking device, the optional robot 9 serves, for example, to attach the milking cups 3 to the teats 102. To this end, a robot arm 10 is provided which either picks up the milking cups 3 from a magazine or is fitted in a fixed manner with a platform of four (or different number of) milking cups 3, as is the case in the Lely Astronaut® system. In the illustrated example, the robot arm 9 is provided with a teat brush 11 which serves to clean and stimulate the teats 102 to produce the milk let-down reflex. In this case, the teat brush 11 serves as a pretreatment means for the teats 102. The robot arm 10 may be provided with either pivotable teat brushes 11 or with an exchangeable pretreatment means.

The other milking means 4 are controlled by the control unit 2, in particular on the basis of the previously stored data regarding the identified dairy animal 100. These data may comprise all kinds of things, such as the milk yield and the point in time of the previous milking, from which the control unit 2 is able to determine the milk production and the milking interval, the lactation stage, in particular the number of days in lactation, etc.

The control unit 2 furthermore contains one or more criteria for terminating a milking, in particular for detaching the milking cup 3. Often, the detachment criterion is based on properties of the milk flow as measured during the milking, in particular by the milk meter 4. This milk meter 4 measures either the amount of milked milk and can then determine, either on its own or by means of the control unit 2, the milking rate from the time derivative value, or the milking rate and can then determine, either by itself or by means of the control unit 2, the amount of milked milk by integrating it over time. The detachment criterion may be chosen from a variety of criteria, but is usually based on a threshold value for the milk flow. This threshold value may be constant, such as 200 ml/minute, or also depend on the peak milk flow, the average milk flow, etc. Independently from the detachment criterion, the control unit 2 may also choose, for example, settings for the other milking means 4 as well, for example in principle constant or also based on a milk flow or differently.

It will be clear that when the detachment threshold and/or the settings for the other milking means is/are constant, the milking will not be optimal under all circumstances. But this also applies, albeit to a lesser degree, if they do depend on, for example, the milk flow. In particular if the milk properties of the dairy animal 100 change over time, for example as a result of growth or changes in the lactation stage or the like, detachment or the choice of settings for the milking might become suboptimal. This will be explained in more detail by means of FIGS. 2a and 2b.

FIGS. 2a, 2b diagrammatically show a diagram of a milk flow profile for a cow at time T1 and at time T2, respectively, with in each case horizontally time t and vertically the milk flow rate M in arbitrary units. T2 is a month later than T1, for example. Incidentally, it should be noted here that the differences in milk flow profile have been shown in an exaggerated way for the sake of clarity and that the criteria for determining the points in time t2, t3 and t4 have been chosen slightly arbitrarily. However, this makes the aim and advantages of the invention even clearer.

As can be seen, the profile at T1 has a nice "square" course comprising, after a pretreatment time up to t1, a rapid rise to t2, a long plateau during the main milking stage up to t3 where the milking rate M only falls slowly, followed by a quick drop to the detachment threshold Maf at t4. The "tail" dashed line of the profile shows the hypothetical milking rate if the milking would have continued after t4. It is clear that the amount of milk which was not obtained, corresponding to the surface of the surface A under the tail, is small.

The milking profile at T2 also shows a pretreatment time which now equals t1', again a rapid rise to t2', a nice plateau up to t3', but then a relatively slow decrease to t4'. The most significant difference with the profile at T1 is a "tail" which continues for much longer, so that there is more milk which could have been obtained. Here, this amount corresponds to the surface of the surface A'.

This knowledge about the "tails" could never have been obtained by means of standard milkings. However, if, according to the invention, the detachment criterion could be made stricter on a regular basis, this knowledge will be obtained. It is then possible, in particular, to calculate a correct amount of milk produced. To this end, the amount of milk which could be obtained by means of a standard, unmodified milking plus the amount of milk in the tail has to be looked at. This last amount can be determined, at least better, by making the detachment threshold stricter, that is to say to lower it, in this case to Maf,s in FIG. 2b. In order not to put too much strain on the dairy animal 100, Maf,s will often not be completely reduced to zero, even though that would in theory produce the most accurate value. However, it will be clear that almost the entire amount of residual milk corresponding to the surface A' has now been milked.

Using the knowledge about the possible milk yield which has been collected in this way, it is possible to gain optimum knowledge about, for example, the milk production. For example, it is thus found that the real milk production is greater than expected. It should be noted that it is even more accurate to milk twice in succession using a stricter detachment criterion, such as said Maf,s, as a threshold value. In this way, it is possible to determine, in the second milking, the actual amount of milk produced during the milking interval and not only the milk which is present and milkable. After all, the latter quantity still comprises the residual milk of the preceding less thorough milking.

Since the course of the milk production of many dairy animals runs virtually linearly to well beyond an average milking interval, calculating the corrected milk production speed is simple, namely "actual value of milk yield/milking interval". On the basis of the corrected milk production speed, it is possible to adjust milking settings where necessary, such as variables which depend on the expected milk yield which is calculated on the basis of a milk production which has been determined as accurately as possible. For example, it is possible to correct a pretreatment time if it depends on the expected amount of cistern milk, and thus indirectly on the expected milk production. It is also possible to make the detachment threshold stricter, so that the amount of residual milk remaining behind in the teat/udder is not excessive.

It is thus also possible to choose a different detachment criterion. For example, a new compromise may be found between a capacity of the milking device which is as high as possible and an amount of residual milk which is smaller than a desired value. The former criterion requires milking at a high milking rate and the latter requires milking to continue until the amount of residual milk drops below this value. Because the residual milk threshold is not absolute, this may be optimised for the herd and the number of milking devices.

Other actions may also be optimised by means thereof, such as a reattachment action. For example, a milking cup is always reattached in the usual way using, at most, a few attempts, if at most 50% of the expected milk yield has been milked. Between 50% and, for example, 80%, at most one attempt at reattachment and milking is made, and beyond 80%, no attempt at reattachment is made. Obviously, the percentages may be chosen differently, but it will be clear that correct knowledge of the milk yield to be expected is necessary in order to make such a method meaningful.

The invention claimed is:

1. A method for milking, a dairy animal by means of a milking device with milking cups and a measuring device for measuring a milk parameter, the method comprising:
   identifying the dairy animal,
   determining a milking interval being a time since a previous milking of said dairy animal,
   attaching one of the milking cups to a teat of the dairy animal,
   calculating at least one expected value of the milk parameter of the dairy animal according to a first formula, wherein the first formula depends on the milking interval and on historical values of said milk parameter of the identified dairy animal measured during one or more previous milkings by the measuring device,
   milking a teat of the dairy animal in a present milking, and
   detaching the milking cup when a first detachment criterion has been met,
   wherein use is made of the at least one expected value of the milk parameter during milking or detaching, without using an actual value of the milk parameter for the milking,
   wherein the actual value is the value of the milk parameter when the milking of the teat takes place using a second detachment criterion which is stricter than the first detachment criterion, and wherein the method furthermore comprises:
   measuring, when the actual value of said milk parameter has not been measured for at least a predetermined number of milkings preceding the present milking and/or for all milkings for at least a predetermined time period preceding the present milking, the actual value of said milk parameter for the present milking, and
   updating, when said measured actual value differs from said expected value, automatically updating, with and in the milking device, the first formula by means of the determined milking interval for the present milking and the measured actual value of the milk parameter of the present milking.

2. The method according to claim 1, wherein the teat is the last-milked teat during the milking, wherein the first detachment criterion is a detachment criterion for the last teat for detaching the last-milked teat, and wherein the detachment criterion for the last teat is less strict than the detachment criterion for one or more of the other teats which stopped being milked earlier during the milking.

3. The method according to claim 2, wherein the second detachment criterion for the last-milked teat is identical to the first detachment criterion for the other teats.

4. The method according to claim 2, wherein the second detachment criterion for the last-milked teat is identical to the second detachment criterion for the other teats.

5. The method according to claim 1, wherein the milking step and the measuring step comprise two successive milkings using the second detachment criterion.

6. The method according to claim 1, wherein the predetermined number of milkings is at least 10.

7. The method according to claim 6, wherein said predetermined number of milkings and/or said predetermined time period-depends on a lactation stage of the dairy animal.

8. The method according to claim 1, wherein the predetermined time period is at least one week.

9. The method according to claim 1, wherein the milk parameter comprises an expected amount of residual milk in the teat.

10. The method according to claim 9, wherein the first detachment criterion for the teat is updated so that when the teat is detached, the expected amount of residual milk satisfies a predetermined residual milk criterion.

11. The method according to claim 1, wherein the milk parameter comprises a term "milking interval*milk production speed", and wherein the milk production speed is updated on the basis of the milking interval of the present milking and a measured real value of the milk yield.

12. The method according to claim 11, wherein the first detachment criterion comprises, for at least one teat, that detachment takes place when a predetermined percentage of the expected milk yield has been reached.

13. The method according to claim 11, wherein the attaching and/or the milking comprises pretreating the teat, wherein a time period and/or an intensity of the pretreatment depends on an expected milk yield.

14. The method according to claim 1, wherein the milk parameter comprises a milking time of the milking.

15. The method according to claim 1, wherein the milk parameter comprises at least one of a milk yield, a residual milk yield, a milking time and a residual milking time, and wherein the milking comprises a reattachment action in case the milking cup inadvertently becomes detached, with the reattachment action depending on the expected value of said at least one of the milk yield, the residual milk yield, the milking time and the residual milking time according to the first formula.

16. A milking device for milking a dairy animal with teats, the milking device comprising:
 a milking means with milking cups for milking a dairy animal,
 a measuring device for measuring a milk,
 an identification device for identifying the dairy animal, and
 a control unit, configured to carry out the method according to claim 1.

17. The milking device according to claim 16, further comprising a pretreatment means for the pretreatment of the teats of the dairy animal using an intensity and/or pretreatment duration which is adjustable by the control unit.

18. The milking device according to claim 1, wherein when updating the first formula, the difference between the measured actual value and the expected value for the present milking which has been recalculated using the updated first formula becomes smaller.

19. The milking device according to claim 18, wherein when updating the first formula, the difference between the measured actual value and the expected value for the present milking which has been recalculated using the updated first formula becomes substantially zero.

20. The method according to claim 1, wherein the predetermined number of milkings is at least 20.

21. The method according to claim 1, wherein the predetermined time period is at least two weeks.

22. The method according to claim 1, wherein the actual value is the value of the milk parameter if the milking of the teat takes place using the second detachment criterion which is stricter than the first detachment criterion and results in substantially complete milking of the teat.

23. A method for milking a dairy animal by means of a milking device with milking cups and a measuring device for measuring a milk parameter, the method comprising:
 identifying the dairy animal,
 determining a milking interval being a time since a previous milking of said dairy animal,
 attaching one of the milking cups to a teat of the dairy animal,
 calculating at least one expected value of the milk parameter of the dairy animal according to a first formula, wherein the expected value the first formula depends on the milking interval and on historical values of said milk parameter of the identified dairy animal measured during one or more previous milkings by the measuring device,
 milking a teat of the dairy animal to which one of the milking cups is attached in a present milking,
 detaching the milking cup when a first detachment criterion has been met, the first detachment criterion being related to the at least one expected value of the milk parameter,
 measuring, when an actual value of said milk parameter has not been measured for at least a predetermined number of milkings preceding the present milking and/or for all milkings for at least a predetermined time period preceding the present milking, the actual value of said milk parameter for the present milking, and
 updating, when (1) said measured actual value differs from said expected value and (2) the actual value is a value of the milk parameter obtained when the milking of the teat takes place using a second detachment criterion which results in less milk remaining in the teat or associated udder quarter than the first detachment criterion, the first formula by means of the determined milking interval for the present milking and the measured actual value of the milk parameter of the present milking.

* * * * *